July 19, 1960
W. A. GERARD ET AL
2,946,027
CAVITY RESONATOR
Filed Aug. 8, 1956
2 Sheets-Sheet 1
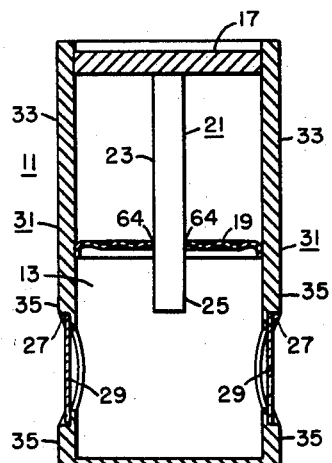
Fig. 1.
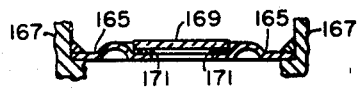
Fig. 2.
Fig. 6.
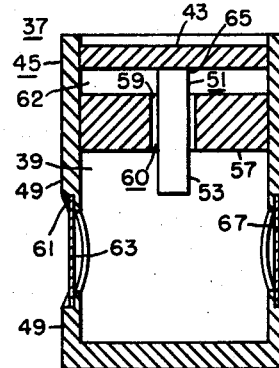
Fig. 3.
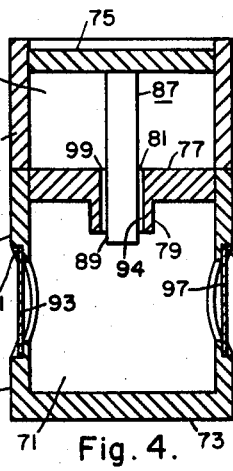
Fig. 4.
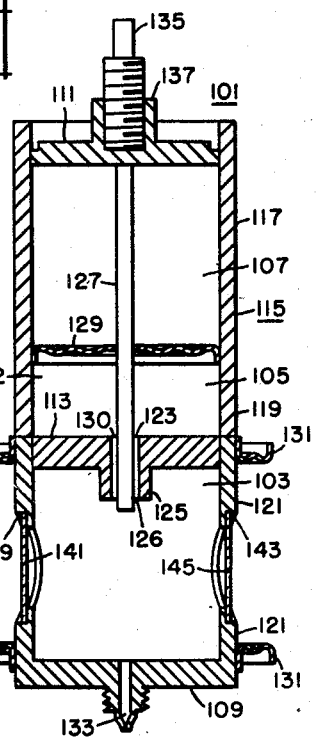
Fig. 5.
WITNESSES
Robert C. Baird
H. O. Blair
INVENTORS
William A. Gerard &
Rodger G. Larson.
BY
F. E. Browder
ATTORNEY United States Patent Office 2,946,027
Patented July 19, 1960

2,946,027
CAVITY RESONATOR

William A. Gerard and Rodger G. Larson, Horseheads, N.Y., assignors to Westinghouse Electric Corporation, East Pittsburgh, Pa., a corporation of Pennsylvania Filed Aug. 8, 1956, Ser. No. 602,831

12 Claims. (Cl. 333—83)

This invention relates to ultra-high frequency devices and, more particularly, to those devices known as cavity resonators.

In certain types of ultra-high frequency electromagnetic wave systems, such as radar systems for use on airplanes and other mobile equipment, it is highly desirable to maintain the output frequency of a given component at a previously chosen standard frequency. For this purpose it is desirable to have a reference cavity resonator which has a relatively high ratio of energy stored to energy dissipated per cycle. This ratio of energy stored to energy dissipated per cycle is related to a factor known as Q, or more specifically, loaded Q or unloaded Q. Loaded Q for a transmission type cavity may be defined as $$Q_L = \frac{f_0}{f_2 - f_1}$$

where $f_0$ equals the resonant frequency of the cavity, $f_2$ equals the frequency above resonance at which the transmitted power falls to half the power value at resonance, and $f_1$ equals the frequency below resonance at which the transmitted power falls to half the power value at resonance. Loaded Q is a cavity characteristic which depends on such things as cavity geometry, materials which comprise the cavity, the amount of energy coupled into and out of the cavity, and the manner in which this coupling is done.

The fundamental quantity upon which the loaded Q is based is called the unloaded Q, and is defined as $$Q_u = \frac{2\pi (\text{Energy stored in a circuit})}{\text{Energy dissipated per cycle}}$$

The relationship between the loaded Q and the unloaded Q may be expressed as:

$$Q_u = \frac{4Q_L(1+\rho)}{4\rho - T_0(1+\rho)^2}$$

where $\rho$ is the voltage standing wave ratio at resonance, and $T_0$ is the resonant transmission fraction.

It is also desirable that the reference cavity remain tuned to a preselected frequency under the external conditions to which such systems are subjected during their operation. The most important of these external conditions is temperature variation. The frequency of the cavity is dependent upon the geometry of the cavity, and, since the cavity expands or contracts with variations in temperature, thereby changing its geometry, both the cavity geometry and the cavity frequency are functions of temperature. Certain types of reference cavities have stringent constant frequency requirements, but no presently known material has sufficiently low thermal expansion characteristics to be satisfactory in this respect for use as a cavity material. In prior art resonant cavities, such as that shown in Fig. 1, temperature compensation was accomplished by means of a strut member made of a material with different expansion characteristics than the material of the cavity itself. This strut member, which was usually made of a material such as Invar when used with the normal copper resonant cavity, was attached to a flexible diaphragm in such a way that a nose portion of the strut member projected into the resonant cavity. However, when the temperature was varied from −55° C. to +100° C. the diaphragm was strained and acquired a "set" and thus was prevented from returning to its original position which in turn caused a variation in the frequency of the cavity. It can be readily seen that this change in frequency may be cumulative and quite large and may cause the cavity to fail during temperature cycling tests.

Accordingly, it is an object of our invention to provide an improved cavity resonator.

It is another object to provide an improved temperature compensated cavity resonator.

It is a further object to provide an improved high Q cavity resonator.

It is an additional object to provide an improved reference resonant cavity.

It is still another object to provide an improved mounting means for a cavity resonator.

It is a still further object to provide an improved energy coupling means for a cavity resonator.

These and other objects of our invention will be apparent from the following description taken in accordance with the accompanying drawings, throughout which like reference characters indicate like parts, which drawings form a part of this application and in which:

Figure 1 is a sectional view of a prior art cavity resonator;

Fig. 2 is a schematic plot of the frequency shift plotted against the ambient temperature of several resonant cavities;

Fig. 3 is a sectional view of a resonant cavity constructed in accordance with one embodiment of our invention;

Fig. 4 is a sectional view of a resonant cavity constructed in accordance with another embodiment of our invention;

Fig. 5 is a sectional view of a resonant cavity constructed in accordance with another embodiment of our invention;

Fig. 6 is a side sectional view of a window means suitable for coupling microwave energy in accordance with another embodiment of our invention;

Figure 8:
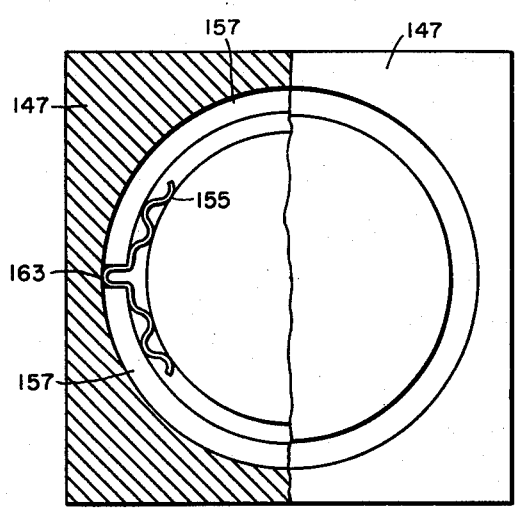
Fig. 8 is a sectional view of Fig. 6 taken along line VII—VII.

In Fig. 1 there is shown a cavity resonator 11 including a resonant cavity portion 13. The cavity resonator 11 is comprised of a lower end wall member 15, an upper end wall member 17 and a side wall member 31. A diaphragm member 19 divides the resonant cavity portion 13 from the remainder of the cavity resonator 11. A strut member 21 is attached to the upper end wall member 17, goes through and is attached, by a brazed joint 64, to the diaphragm member 19. The strut member 21 has a strut member nose portion 25 which protrudes into the resonant cavity portion 13. The side wall member 31 has an upper side wall portion 33 and a lower side wall portion 35. The lower side wall portion 35 includes energy coupling openings 27 which may be closed by window members 29.

Frequently prior art cavity resonators, such as that shown in Fig. 1, were made of a copper body and the strut member was made of Invar and served as a temperature compensator. As the temperature changed the strut member 21 did not expand or contract as much as the copper cavity resonator 11 and, consequently, the diaphragm member 19 was slightly deformed and the nose portion 25 moved with respect to the resonant cavity portion 13. In this manner the resonant frequency was maintained nearly constant because of the cancellation of the inherent temperature frequency variations by those produced by the motion of the strut member 21 and diaphragm member 19. However, it was found that when the temperature was varied considerably the diaphragm member 19 was permanently deformed and, therefore, when the temperature was raised from room temperature and then lowered again the diaphragm member 19 would not be in the same position and the resonant frequency would be different.

This is shown in Fig. 2 where the frequency shift of the resonant cavity is plotted against the ambient temperture. Curves 1 and 2 are for resonant cavities having diaphragms similar to that shown in Fig. 1. Curve 1 applies to a typical prior art cavity while curve 2 applies to a prior art cavity at its best and the difference in curves 1 and 2 is due to differences in diaphragm setting. Curve 3 will be discussed later. As can be seen, if the ambient temperature is varied from room temperature either considerably above room temperature or considerably below room temperature and is then returned again to room temperature, the frequency does not return to the same place. It has been also found that this frequency shift may become cumulative and result in unstable resonant cavities. This phenomenon is frequently called hysteresis. This hysteresis has been measured as high as 0.4 mc. for a 9,280 mc. cavity.

In Fig. 3 there is shown a cavity resonator 37 in which the diaphragm member shown in Fig. 1 has been eliminated. The cavity resonator 37 comprises a lower end wall member 41, an upper end wall member 43 and a side wall member 45 which in turn is comprised of an upper side wall portion 47 and a lower side wall portion 49. An intermediate wall means 57 having intermediate wall means aperture portion 59 divides the resonant cavity portion 39 from the remainder of the cavity resonator. A strut member 51 is attached to the upper end wall member 43 by means of a brazed joint 65 and extends through the intermediate wall means aperture portion 59 without touching the intermediate wall means 57. The strut member 51 includes a strut member nose portion 53 which protrudes into the resonant cavity portion 39. The lower side wall portion 49 includes input coupling opening 61 having an input window member 63 and an output coupling opening 65 having an output window member 67.

In the elimination of the diaphragm member from this embodiment the nose member-diaphragm member braze joint has also been eliminated and has been replaced by a choke joint 60. One form of this choke joint 60 is shown in Fig. 3 in which a portion of the strut member 51 acts as a length of coaxial line approximately a quarter wave length long. The choke joint 60 also includes a radial line portion 62 which is also approximately a quarter wave length long. It may be seen that the braze joint 65 between the strut member 51 and the upper end wall member 43 is at a point of very low current and as such introduces negligible loss in contrast with the position of the nose-member diaphragm-member braze joint 64 of Fig. 1 which has been eliminated in Figs. 3–5.

In Fig. 4 there is shown another embodiment of our invention which has certain advantages over the embodiment shown in Fig. 3. While the embodiment shown in Fig. 3 was found to be very stable under temperature cycling, the Q was not as high as might be desired. We believe this is because the break in the cavity at the aperture portion 59 in Fig. 3, which was necessary for tuning and temperature compensation, occurs at a high current portion of the resonant cavity 39. We have found that if the break in the cavity is made nearer to the end of the nose portion of the strut member, the resonant cavity has a higher Q since the losses due to the choke joint will have a smaller effect on the cavity. This is shown in Fig. 4 which includes a cavity resonator 69 comprising a lower end wall member 73, an upper end wall member 75 and a side wall member 83 which in turn is comprised of an upper side wall portion 85 and a lower side wall portion 86. An intermediate wall means 77 having an intermediate wall means aperture portion 81 divides the resonant cavity portion 71 from the remainder of the cavity resonator 69. The intermediate wall means 77 includes an outer nose portion 79 which in this embodiment, is shaped as a hollow cylindrical appendage to the intermediate wall means 77. As can be seen the outer nose portion 79 is adjacent to and surrounds said aperture portion 81. A strut member 87 is attached to the upper end wall member 75 and extends through the intermediate wall means aperture portion 81 and includes an inner nose portion 89 which is positioned within the outer nose portion 79. The lower side wall portion 86 includes an input coupling opening 91 having an input window member 93 and an output coupling opening 95 having an output window member 97. Also in this embodiment a choke joint 99 has been introduced in place of the nose diaphragm braze joint 64 of Fig. 1 and includes a low impedance quarter wave length coaxial line portion 94 and a high impedance quarter wave length coaxial line portion 98. It is the object of this choke to provide a very low impedance at the break in the resonant cavity near the inner nose portion 89. Therefore, it is important that the outer nose portion 79 does not come into physical contact with the inner nose portion 89 for proper operation of the choke and sometimes it may be desirable to attach a small bead of glass or similar insulating material around the inner nose portion 89 to keep it separated from the outer nose portion 79.

In Fig. 5 there is shown a modification of our embodiment shown in Fig. 4 including a cavity resonator 101 including a lower end wall member 109, an upper end wall member 111 and a side wall member 115. This side wall member 115 includes an upper side wall portion 117, a middle side wall portion 119 and a lower side wall portion 121. A resonant cavity portion 103 is bounded by the lower end wall member 109, the lower side wall portion 121 and is separated from the remainder of the cavity resonator 101 by an intermediate wall means 113. A choke portion 105 is bounded by the middle side wall portion 119, the intermediate wall means 113 and a diaphragm member 129. A compensator portion 107 is bounded by the upper end wall member 111, the upper side wall portion 117 and the diaphragm member 129. A strut member 127 is attached to the upper end wall member 111, extends through the compensator portion 107 and through the diaphragm member 129 to which it is attached. The strut member 127 also extends through the choke portion 105 and through an intermediate wall aperture portion 123. The strut member 127 has an inner nose portion 126 which is positioned within an outer nose portion 125 which is a part of the intermediate wall means 113. As can be seen in this particular embodiment, the outer nose portion 125 is adjacent to and surrounds said aperture portion 123. As in Fig. 4, the outer nose portion 125 should not touch the inner nose portion 126 and may be prevented from doing so by attaching a small bead of glass or other insulating material to the inner nose portion 126. Also as in Fig. 4, a choke joint 130 is comprised of a portion of the strut member 127 which acts as a quarter wave length coaxial line. The choke joint 130 also includes a quarter wave length coaxial line 132 which is in the choke portion 105 of the cavity resonator. The lower side wall portion 121 includes an output coupling opening 139 having an input window member 141 and an output coupling opening 143 having an output window member 145. Mounting ring members 131 are attached to the outside of the side wall member 115 and a tipped off exhaust tubulation 133 extends through the lower end wall member 109. A threaded section for temperature compensation or frequency adjustment is attached to the lower end wall member 109 and a tuning screw member 135 which is used for frequency adjustment is attached to the upper end wall member 111. This tuning screw member 135 is usually removed before housing the cavity resonator 101. The upper end wall member 111 may act as a tuning washer and may be adjustable to a certain extent.

We have found that suitable dimensions for the resonant cavity portion 103 of the cavity resonator 101 are a diameter of 0.875 inch and a length of 0.905 inch. A suitable outer nose portion 125 diameter is 0.0875 inch with a length of 0.161 inch. The length of the strut member 127 is 1.385 inches. The choke joint 130 is actually a half wave length shorted line with the diaphragm member 129 forming the short. As the diaphragm member 129 is not a part of the resonant cavity portion 103 any possible deformation of the diaphragm member 129 will have a negligible effect on the frequency of the resonant cavity portion 103. Also, if desired, the aperture portion 123 may be made slightly larger in its upper portion as compared to its lower portion to minimize the possibility of the inner nose portion 126 touching the outer nose portion 125.

Energy is coupled to the resonant cavity portion 103 by the input and output coupling openings 139 and 143. We have found that improved coupling is obtained by using an input coupling opening 139 having a slightly larger diameter than the output coupling opening 143. For example, we have found that an input coupling opening 139 having a diameter of 0.328 inch when used with an output coupling opening having a diameter of 0.282 inch will yield a voltage standing wave ratio below 1.4 and insertion loss less than 6 db and a loaded Q between 2100 and 2400. Changes in coupling can be effected by changing the size of the openings of the tube. If the resonant cavity portion 71 has an unloaded Q of about 6500 the values of Q, of the voltage standing wave ratio and of the insertion loss can be varied but not independently of each other. For example, the insertion losses may be made lower by making the output coupling opening 95 larger but this also lowers the value of the loaded Q. A proper pair of coupling openings will bring all of the electrical characteristics within desirable limits.

Microwave devices of this type require coupling windows to permit the transfer of microwave energy from one region of enclosed space to another through relatively heavy copper walls. These windows are usually a glass or ceramic-to-metal seal. The glass must have a low dielectric constant, be a low dielectric loss material and be capable of maintaining a vacuum tight seal to the metal when cycled through considerable ranges of temperature. These requirements are not always compatible. The practice previously has been to select a glass and metal whose thermal expansion coefficients match reasonably well over the desired temperature range. The glass and metal are sealed together by oxidizing the metal and dissolving some of the metal in the molten glass. Then the metal is attached to the wall of the device by known soldering techniques. When the metal to which the glass is sealed is properly contoured a type of bellows action permits differences of thermal expansion between the cavity wall and window structure. However, this necessity for contouring frequently imposes undesirable limitations on designs and materials.

In one particular prior art case the glass used is Corning glass #7052 and the metal is Kovar. Better glass for radio frequency uses is Corning glass #7070 but its temperature match to Kovar is not too satisfactory and a possibility of seal failure due to temperature variations exists unless particular attention is paid to the fabrication and preparation of the metal before the seal is formed. The use of Kovar requires not only extensive preparation before sealing the glass to the Kovar but also requires preparation before sealing the Kovar to the copper microwave device. The oxides which have not been dissolved in the glass must be removed and the Kovar must be copper plated before soldering. An additional difficulty has been found when the complete microwave device is temperature cycled either during testing or operation, a permanent shift of dimensions of the copper structure can result because of the difference in the thermal expansion coefficients between Kovar and copper and because of the variable ductility of the solder over the range of $-55°$ C. to $+100°$ C. This dimension change causes an undesirable frequency shift.

We have found that with use of an "epoxy resin" copper may be sealed to #7070 glass forming a vacuum type flexible seal. These epoxy resins seals may be made between a variety of glass and metal combinations easily and economically. The elimination of the Kovar and relatively poor radio frequency glass has resulted in an improvement in the electrical characteristics as measured by the voltage standing wave ratio, Q, and insertion loss. Because the window frame and the microwave device wall are of the same metal, stability characteristics are improved. Also, because of the low temperature in which the seal is made, comparatively thin sections of copper may be used without loss of strength or danger of porosity due to oxidation. In the event that other materials with better radio frequency characteristics than #7070 glass are available an epoxy resin seal may be made without regard to temperature expansion coefficients. The desirable stability of the epoxy resin seal probably results from the resin seal yielding with changes in temperature.

In general an epoxy resin is a glycidyl polyether and may be prepared by reacting a predetermined amount of at least one polyhydric phenol and at least one epihalohydrin in an alkaline medium. We have found that a suitable epoxy resin (Ciba AN-100, for example) in the form of a dry powder may be lightly dusted on the surface to a sealed and heated in air at about 150° C. until the powder begins to fuse. The glass is then put in place and while constant pressure is applied the assembly is heated at 250° C. in air until the resin is cured.

In Fig. 6 there is shown a suitable embodiment of a microwave window sealed with epoxy resin. A flexible member 165, which may be made of copper, is sealed to the main body 167 of the cavity, which also may be copper, by normal methods such as soldering. A suitable glass window member 169, which may suitably be Corning #7070 glass, is sealed by means of the epoxy resin 171 in the above manner. This particular structure has been found to be very stable and has the desirable flexibility without permanent distortion with variation in temperature.

In the construction of the cavity resonator 101 the resonator itself is first brazed together. The frequency of the cavity with no compensator is called the asymptotic frequency. The compensation rate of the complete cavity at a particularly frequency depends on the difference between the asymptotic frequency and the operating frequency. The asymptotic frequency may be adjusted either at this stage of the assembly or after final assembly and, therefore, compensation rate adjustment may be made. The compensator assembly is assembled separately and is brazed into the cavity, paying particular attention to careful alignment to prevent shorting of the inner nose portion 126 and the outer nose portion 125. The resonant cavity portion 103 is completed by soldering the window members in place and evacuating the cavity to a pressure of about 5 to 10 microns. Evacuation is necessary to remove water vapor which could cause poor low temperature compensation. At this pressure the cavity can be readily checked for leaks by placing it in a strong microwave field. If properly sealed the cavity will exhibit a typical glow discharge. If leaks occur they may be detected because the glow discharge will disappear and the tube will either remain dark or exhibit a corona discharge at the nose.

When completed the cavity resonator may be mounted in an aluminum block as described in U.S. Patent 2,584,-717, Alpert et al., assigned to the same assignee as the subject application, or in various modifications of that method. We have found the method of mounting shown in Figs. 7 and 8 to be particularly suitable.

Figure 7:
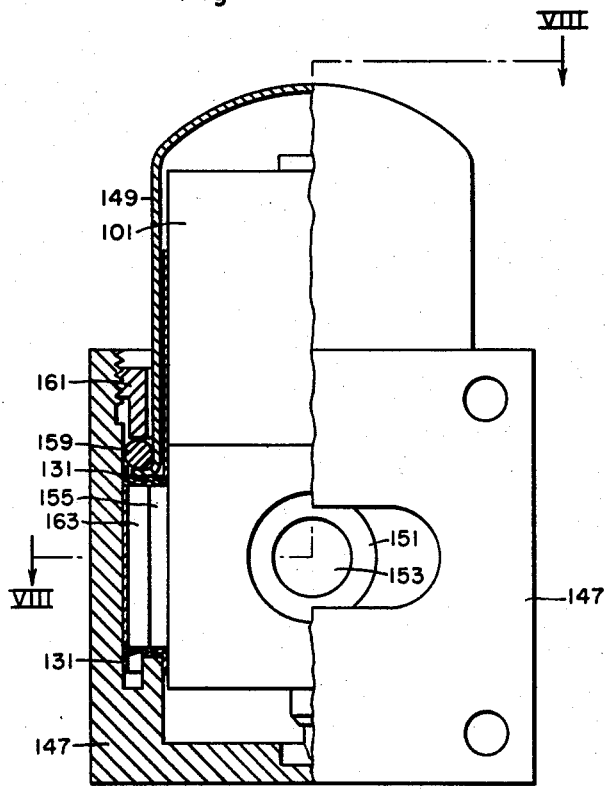
Fig. 7 is a side view partly in section of a resonant cavity housed and mounted in accordance with one embodiment of our invention.

In Fig. 7 there is shown a cavity resonator 101 enclosed in a housing member 149 and a mounting block member 147. The coupling opening member 151 and the window opening member 153 are also shown. The mounting ring members 131 are shown at the top and bottom of a resilient corrugated spacing member 155. As shown in Fig. 8, this corrugated spacing member 155 has a projecting portion 163 which projects between two partial sleeve members 157. Also shown are a deformable O-ring member 159 and a lock nut member 161. The two mounting ring members 131 are held tightly against the mounting block member 147 which confines the microwave energy to the annular space between the cavity proper and the mounting block 147. In order to exert the necessary pressure the two partial sleeve members 157 (in the particular embodiment shown, half-sleeve members are used) are introduced between the mounting ring members 131 and the corrugated spacing member 155 is utilized to short the radio frequency leakage path. By this method the cavity resonator 101 is firmly positioned, leakage is eliminated and thermal and mechanical isolation is retained. Tests have shown that this mounting method lowers the leakage to a minimum of 40 db down as compared to 20 db in previous mounting arrangements. Of course, variations may be made in the number and shape of the corrugated spacing member 155 and the partial sleeve members 157 while utilizing the same principle.

In previous cavity resonators, such as that shown in Fig. 1, an Invar strut member was utilized because of its ease of machinability and its fairly low expansion characteristics due to temperature variations. However, Invar, like all alloys, varies very slightly from lot to lot and from one specimen to another in the same lot. These very small variations affect the linear coefficient of thermal expansion of Invar so that the reproducibility of temperature compensation struts was difficult to achieve. For example a change in carbon content of 0.2% could double the expansion of the Invar. Furthermore, Invar does not have a uniform expansion coefficient over the entire desired range of temperature, namely from −55° C. to +100° C., so that a resonant cavity which is compensated adequately over a part of that temperature range may not be compensated adequately over another part of the temperature range. We have found that tungsten would be a desirable material from a thermal expansion viewpoint to use for temperature expansion struts but because of the extreme difficulty in machining tungsten to the dimensional tolerances required it has not been practical to use it previously. If the tungsten is coated with a material such as copper it is easily machinable and the copper has high conductivity which is desirable for a nose member protruding into a resonant cavity. The copper may be readily machined after it is plated on the tungsten strut member. By use of a nickel-gold eutectic brazing alloy the tuning washers and diaphragm member may be brazed to the tungsten strut.

Curve 3 of Fig. 2 applies to a cavity resonator similar to that shown in Fig. 5 with windows made as shown in Fig. 6. As can be seen, excellent temperature compensation has been achieved with frequency variations of less than 0.1 mc. over a temperature range from −55° C. to +71° C. including hysteresis effects. Resonant cavities of this type have been cycled up to 50 cycles from −55° C. to +100° C. with less than 0.1 mc. change in room temperature frequency. As most of this change occurs in the first few cycles, the cavities are extremely stable after a few "aging" cycles. Of course, this type of compensated cavity could be used as a reaction type cavity as well as a transmission type.

While the present invention has been shown in a few forms only it will be obvious to those skilled in the art that it is not so limited but is susceptible of various changes and modifications without departing from the spirit and scope thereof.

We claim as our invention:

1. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means.

2. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means, said outer nose member being spatially separated from said strut member.

3. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means, said energy coupling means comprising an input window member and an output window member, said window members having unequal diameters.

4. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, said outer nose portion having the shape of a hollow cylinder, a temperature compensating strut member for keeping the frequency of said resonant cavity substantially constant in accordance with changes in the ambient temperature, said temperature compensating strut member extending through said aperture and being positioned within said outer portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means.

5. A cavity resonator comprising side wall means, lower end wall means and upper end wall means, said side wall means comprising upper, middle and lower side wall means, said wall means forming a hollow chamber, intermediate wall means dividing said chamber into a resonant cavity portion and a compensator portion, a diaphragm member dividing said compensator portion into a choke portion and an upper compartment portion, said resonant cavity portion being defined by said lower end wall means, said lower side wall means and said intermediate wall means, said compensator portion being defined by said upper end wall means, said intermediate wall means, said upper side wall means and said middle side wall means, said choke portion being defined by said intermediate wall means, said diaphragm means and said middle side wall means, said upper compartment portion being defined by said upper end wall means, said diaphragm means and said upper side wall means, said intermediate wall means having an aperture therein and having an outer nose portion adjacent to and surrounding said aperture, said outer nose portion protruding into said resonant cavity portion, a temperature compensating strut member for keeping the frequency of said resonant cavity portion substantially constant in accordance with changes in the ambient temperature, said temperature compensating strut member being made substantially of a first material, said wall means defining said resonant cavity portion being made substantially of a second material, said first material and said second material having different coefficients of thermal expansion, said temperature compensating strut member extending from said upper wall means through said upper compartment portion, through said diaphragm means, through said choke portion and through said aperture of said intermediate wall means, and being positioned within said outer nose portion and forming a substantially quarter wavelength choke joint therewith, said temperature compensating strut member including an inner nose portion which protrudes slightly into said hollow chamber, and said resonant cavity portion having energy coupling means.

6. A cavity resonator comprising side wall means, lower end wall means and upper end wall means, said side wall means comprising upper, middle and lower side wall means, said wall means forming a hollow chamber, intermediate means dividing said chamber into a resonant cavity portion and a compensator portion, a diaphragm member dividing said compensator portion into a choke portion and an upper compartment portion, said resonant cavity portion being defined by said lower end wall means, said lower side wall means and said intermediate wall means, said compensator portion being defined by said upper end wall means, said intermediate wall means, said upper side wall means and said middle side wall means, said choke portion being defined by said intermediate wall means, said diaphragm means and said middle side wall means, said upper compartment portion being defined by said upper end wall means, said diaphragm means and said upper side wall means, said intermediate wall means having an aperture therein and having an outer nose portion adjacent to and surounding said aperture, said outer nose portion protruding into said resonant cavity portion, a temperature compensating strut member for keeping the frequency of said resonant cavity portion substantially constant in accordance with changes in the ambient temperature, said temperature compensating strut member being made substantially of a first material, said wall means defining said resonant cavity portion being made substantially of a second material, said first material and said second material having different coefficients of thermal expansion, said temperature compensating strut member extending from said upper wall means through said upper compartment portion, through said diaphragm means, through said choke portion and through said aperture of said intermediate wall means, and being positioned within said outer nose portion and forming a substantially quarter wavelength choke joint therewith, said temperature compensating strut member including an inner nose portion which protrudes slightly into said hollow chamber, and said resonant cavity portion having energy coupling means, said outer nose portion being spatially separated from said strut member.

7. A cavity resonator comprising side wall means, lower end wall means and upper end wall means, said side wall means comprising upper, middle and lower side wall means, said wall means forming a hollow chamber, intermediate wall means dividing said chamber into a resonant cavity portion and a compensator portion, a diaphragm member dividing said compensator portion into a choke portion and an upper compartment portion, said resonant cavity portion being defined by said lower end wall means, said lower side wall means and said intermediate wall means, said compensator portion being defined by said upper end wall means, said intermediate wall means, said upper side wall means and said middle side wall means, said choke portion being defined by said intermediate wall means, said diaphragm means and said middle side wall means, said upper compartment portion being defined by said upper end wall means, said diaphragm means and said upper side wall means, said intermediate wall means having an aperture therein and having an outer nose portion adjacent to and surrounding said aperture, said outer nose portion protruding into said resonant cavity portion, a temperature compensating strut member for keeping the frequency of said resonant cavity portion substantially constant in accordance with changes in the ambient temperature, said temperature compensating strut member being made substantially of a first material, said wall means defining said resonant cavity portion being made substantially of a second material, said first material and said second material having different coefficients of thermal expansion, said temperature compensating strut member extending from said upper wall means through said upper compartment portion, through said diaphragm means, through said choke portion and through said aperture of said intermediate wall means, and being positioned within said outer nose portion and forming a substantially quarter wavelength choke joint therewith, said temperature compensating strut member including an inner nose portion which protrudes slightly into said hollow chamber, and said resonant cavity portion having energy coupling means, said energy coupling means comprising an input window member and an output window member, said window members having unequal diameters.

8. A cavity resonator comprising side wall means, lower end wall means and upper end wall means, said side wall means comprising upper, middle and lower side wall means, said wall means forming a hollow chamber, intermediate wall means dividing said chamber into a resonant cavity portion and a compensator portion, a diaphragm member dividing said compensator portion into a choke portion and an upper compartment portion, said resonant cavity portion being defined by said lower end wall means, said lower side wall means and said intermediate wall means, said compensator portion being defined by said upper end wall means, said intermediate wall means, said upper side wall means and said middle side wall means, said choke portion being defined by said intermediate wall means, said diaphragm means and said middle side wall means, said upper compartment portion being defined by said upper end wall means, said diaphragm means and said upper side wall means, said intermediate wall means having an aperture therein and having an outer nose portion adjacent to and surrounding said aperture, said outer nose portion having the shape of a hollow cylinder, said outer nose portion protruding into said resonant cavity portion, a temperature compensating strut member for keeping the frequency of said resonant cavity portion substantially constant in accordance with changes in the ambient temperature, said temperature compensating strut member being made substantially of a first material, said wall means defining said resonant cavity portion being made substantially of a second material, said first material and said second material having different coefficients of thermal expansion, said temperature compensating strut member extending from said upper wall means through said upper compartment portion, through said diaphragm means, through said choke portions and through said aperture of said intermediate wall means, being positioned within said outer nose portion and forming a substantially quarter wavelength choke joint therewith, said temperature compensating strut member including an inner nose portion which protrudes slightly into said hollow chamber, and said resonant cavity portion having energy coupling means.

9. A resonant cavity comprising side wall means, first end wall means and second wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means, a plurality of partial sleeve members surrounding at least a portion of said resonant cavity, at least two of said partial sleeve members being separated from each other and from said resonant cavity by a resilient spacing member and a housing member surrounding said partial sleeve members.

10. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means, a plurality of partial sleeve members surrounding at least a portion of said resonant cavity, at least two of said partial sleeve members being separated from each other and from said resonant cavity by a resilient spacing member, said resilient spacing member having projecting portions projecting between said partial sleeve members for resiliently positioning said partial sleeve members, and a housing member surrounding said partial sleeve members.

11. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, said hollow chamber having energy coupling means, a plurality of partial sleeve members surrounding at least a portion of said resonant cavity, at least two of said partial sleeve members being separated from each other and from said resonant cavity by a resilient spacing member, said resilient spacing member having projecting portions projecting between said partial sleeve members for resiliently positioning said partial sleeve members, said resilient spacing members extending substantially along the length of said resonant cavity so that said resonant cavity is firmly positioned, said resilient spacing member touching said partial sleeve members and said resonant cavity at a number of points and a housing member surrounding said partial sleeve members.

12. A resonant cavity comprising side wall means, first end wall means and second end wall means forming a hollow chamber, said first end wall means having an aperture therein and having an outer nose portion adjacent to and surrounding said aperture, said outer nose portion protruding into said hollow chamber, a temperature compensating strut member for keeping the frequency of said resonant cavity substantially constant in accordance with changes in the ambient temperature, said temperature compensating strut member extending through said aperture and being positioned within said outer nose portion and forming a substantially quarter wavelength choke joint therewith, said temperature compensating strut member being made substantially of a first material, said wall means being made substantially of a second material, said first material and second material having different coefficients of thermal expansion, said temperature compensating strut member including an inner nose portion which protrudes slightly into said hollow chamber, a cavity break portion located between the end of said outer nose portion that protrudes into said hollow chamber and said strut member, said break portion being located in the region of low current and of low impedance, said hollow chamber having energy coupling means.

References Cited in the file of this patent

UNITED STATES PATENTS

| | | |
|---|---|---|
| 2,103,515 | Conklin et al. | Dec. 28, 1937 |
| 2,483,768 | Hershberger | Oct. 4, 1949 |
| 2,503,256 | Ginzton et al. | Apr. 11, 1950 |
| 2,533,912 | Bels | Dec. 12, 1950 |
| 2,584,717 | Alpert et al. | Feb. 5, 1952 |
| 2,682,623 | Woodyard et al. | June 29, 1954 |
| 2,752,524 | Martin | June 26, 1956 |